United States Patent [19]

Turino

[11] Patent Number: 4,720,672
[45] Date of Patent: Jan. 19, 1988

[54] TESTABILITY SYSTEM

[76] Inventor: Jon Turino, 96 Sheeren Pl., Suite 101, Campbell, Calif. 95009

[21] Appl. No.: 625,107

[22] Filed: Jun. 27, 1984

[51] Int. Cl.[4] .................... G01R 15/12; G01R 31/22; G01R 31/28
[52] U.S. Cl. ........................... 324/73 R; 324/158 R; 371/27
[58] Field of Search .......... 324/73 R, 73 PC, 73 AT, 324/158 R; 340/870.13; 371/27

[56] References Cited

U.S. PATENT DOCUMENTS 3,919,637 11/1975 Earp .................................. 324/73 R

FOREIGN PATENT DOCUMENTS 0008265 6/1984 Japan ................................ 324/73 R

OTHER PUBLICATIONS

Labare et al.; "Tester for Data Processor"; IBM Technical Disclosure Bulletin; vol. 18, No. 1; Jun. 1975; pp. 184–185.

*Primary Examiner*—Ernest F. Karlsen
*Assistant Examiner*—Vinh P. Nguyen
*Attorney, Agent, or Firm*—Alvin E. Hendricson

[57] ABSTRACT

A system for enhancing the testability of functional electronic circuitry may be provided as a separate device or incorporated in circuits and includes serial or parallel control point input data capability applied through tri-statable output drivers to input nodes of circuit elements of functional circuitry without interference with such circuitry during non-testing situations and receivers for observing resultant logic states at output nodes of functional circuitry being tested.

6 Claims, 3 Drawing Figures

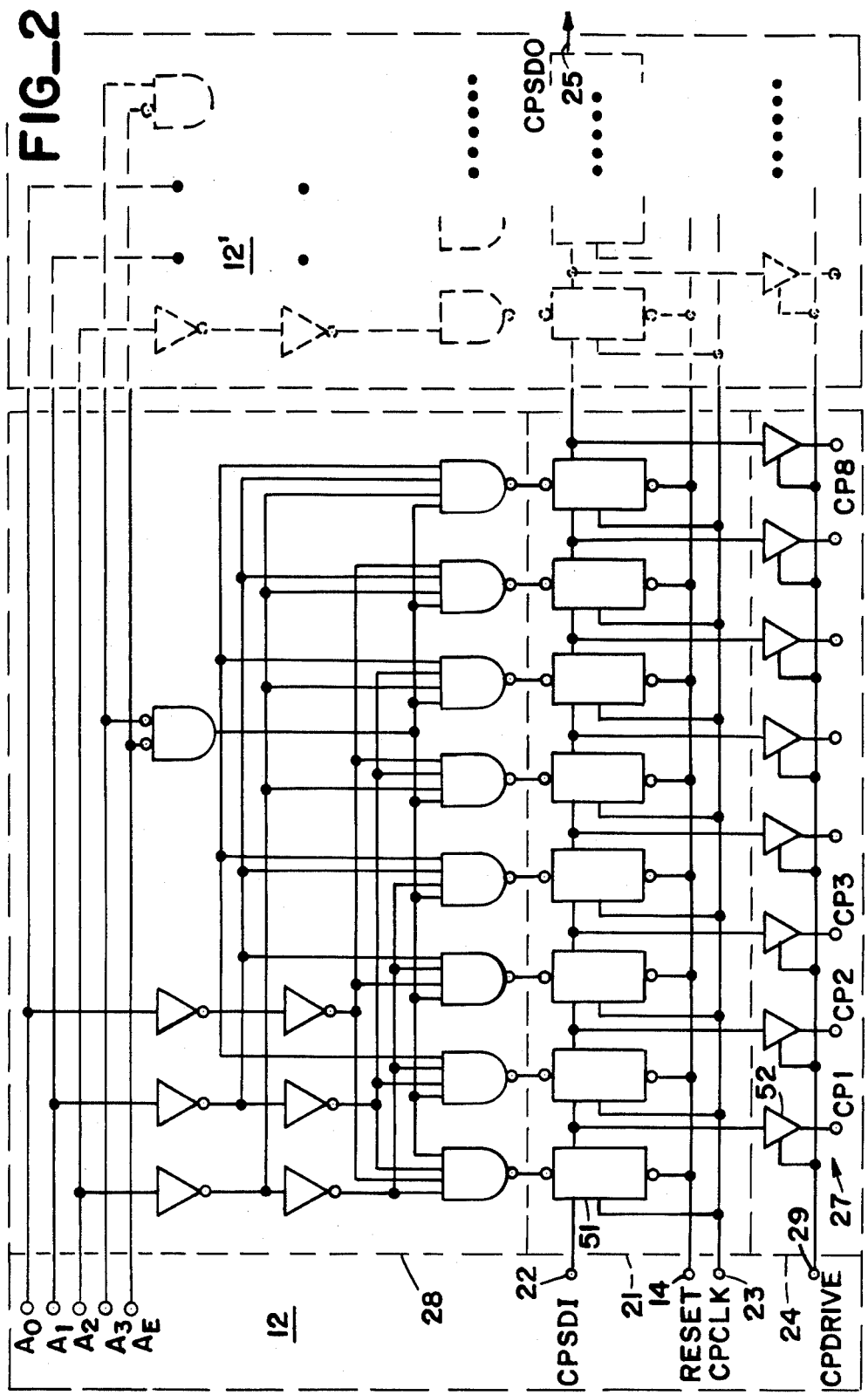
FIG_2

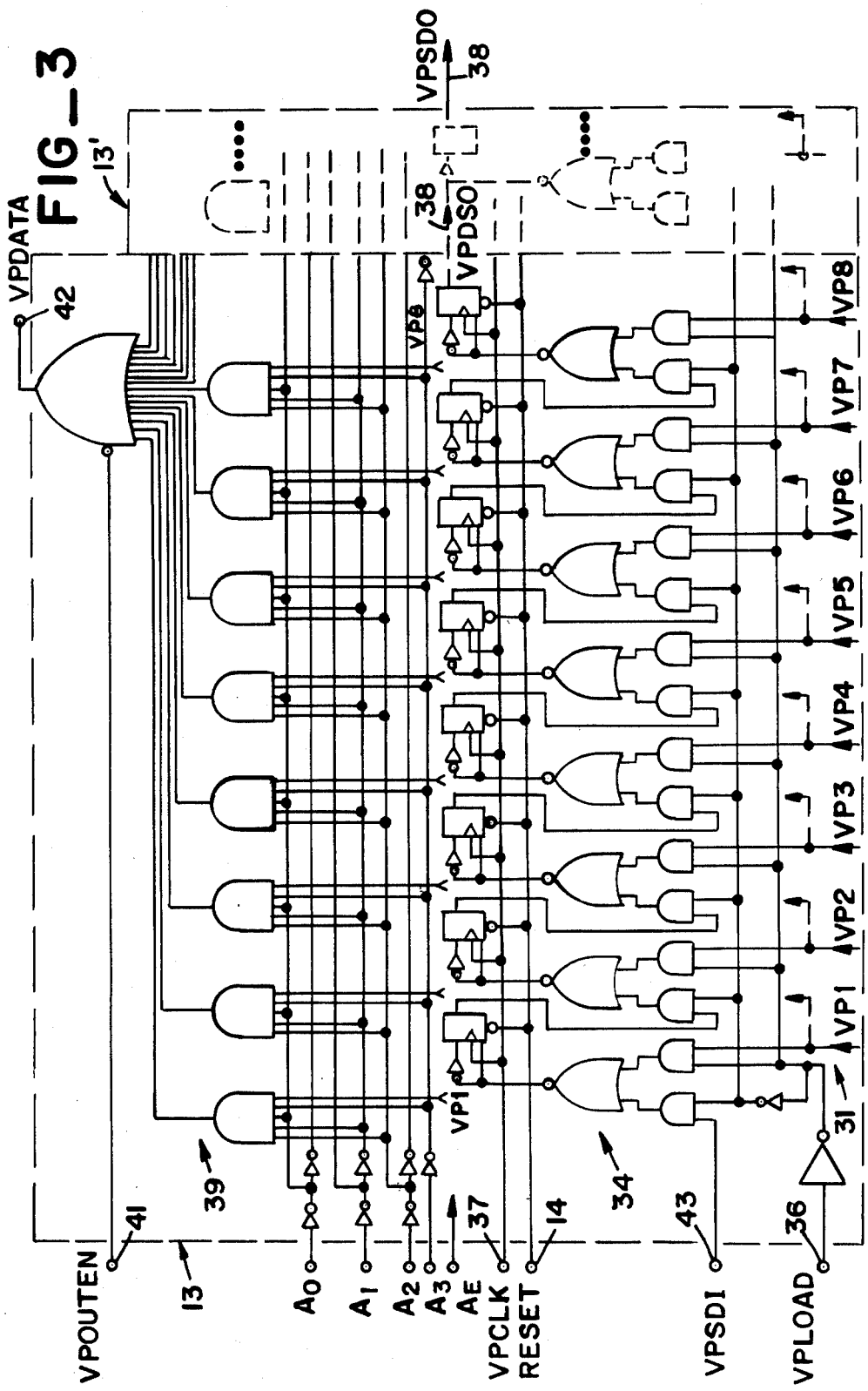

TESTABILITY SYSTEM

The present invention facilitates the establishment of a serial or parallel "testability bus" using as few as four input/output pins when a shift register is added to the parallel input lines, or using an unlimited number of individual parallel input lines, as an aid to verifying the performance of functional circuitry either in externally initiated or internally automatic on-line monitored built in test mode, without substantially affecting the logic design or logic functions of the circuitry.

BACKGROUND OF THE INVENTION

Present functional, or logic, circuitry may be quite complex in including a large number of semiconductor circuits, or devices that may be incorporated in electronic printed circuit board assemblies, forming parts of an electronic system. Such circuitry is tested during assembly and may also be subsequently tested periodically. Conventionally there are employed parallel data based tested equipment and serial data input/output techniques which are substantially incompatible. Each of the foregoing, however, have certain advantages and the present invention provides the capability of employing serial data based test equipment and methods to more efficiently evaluate parallel logic states within the functional combinatorial and sequential circuitry to which it is applied and to allow parallel data of, or in conjunction with, the serial data input/output techniques required by other testability enhancement architectures and circuits.

SUMMARY OF THE INVENTION

The present invention operates to enhance functional circuit testability by providing the means to force, via the testing interface, known logic states at the input nodes to the circuitry to which it is applied, to transfer the logic states of the output nodes of the functional circuitry to the testing interface, and to do so completely independent of the design of the functional circuitry to which it is applied. There is provided hereby a unique combination of parallel and serial data input and output transfer functions providing for controllability of any or all of the inputs to circuit elements in the functional circuitry to which it is applied and concurrent observability of the existing or resulting logic states at the outputs of that functional circuitry.

The architecture of the present invention incorporates a serializer to receive serial input data and apply same to output drivers, all in response to clock pulses. In addition, test point address inputs receiver parallel data in terms of addresses, which are employed to apply a logic "1" or "0" to related serializer locations for application to output drivers. Tri-statable output drivers, i.e., electronic drivers that may be selectively placed in three states, receive input data and are adapted for connection to predetermined control points of functional circuitry to be tested.

Provision is also made for examining the logic states of selected "visibility points" in a circuit or system being tested and receiving data at control points thereof, from the output drivers of the present system. A visibility point serializer is loaded via unit load receivers with visibility point logic states in response to a load signal and may be read out in response to clock signals. Alternatively an enable signal is employed to operate a tristate encoder/multiplexer for outputting the real time states of the visibility points.

There is also incorporated herein the capability of verifying the integrity of either parallel or serial data loaded into the control point serializer and verifying the integrity of data input and transfer unit load receivers, visibility point serializer and encoder/multiplexer. Additionally, provision is made for cascading systems in accordance with the present invention to increase the number of control points that can be driven and visibility points that can be examined.

BRIEF DESCRIPTION OF FIGURES

This present invention is illustrated with respect to a preferred embodiment and one manner of implementation thereof in the accompanying drawings, wherein:

FIG. 2 is a circuit diagram of an implementation of the control point section of the system of FIG. 1 and FIG. 3 is a circuit diagram of an implementation of the visibility section of the system of FIG. 1.

DESCRIPTION OF PREFERRED EMBODIMENT

Figure 1:
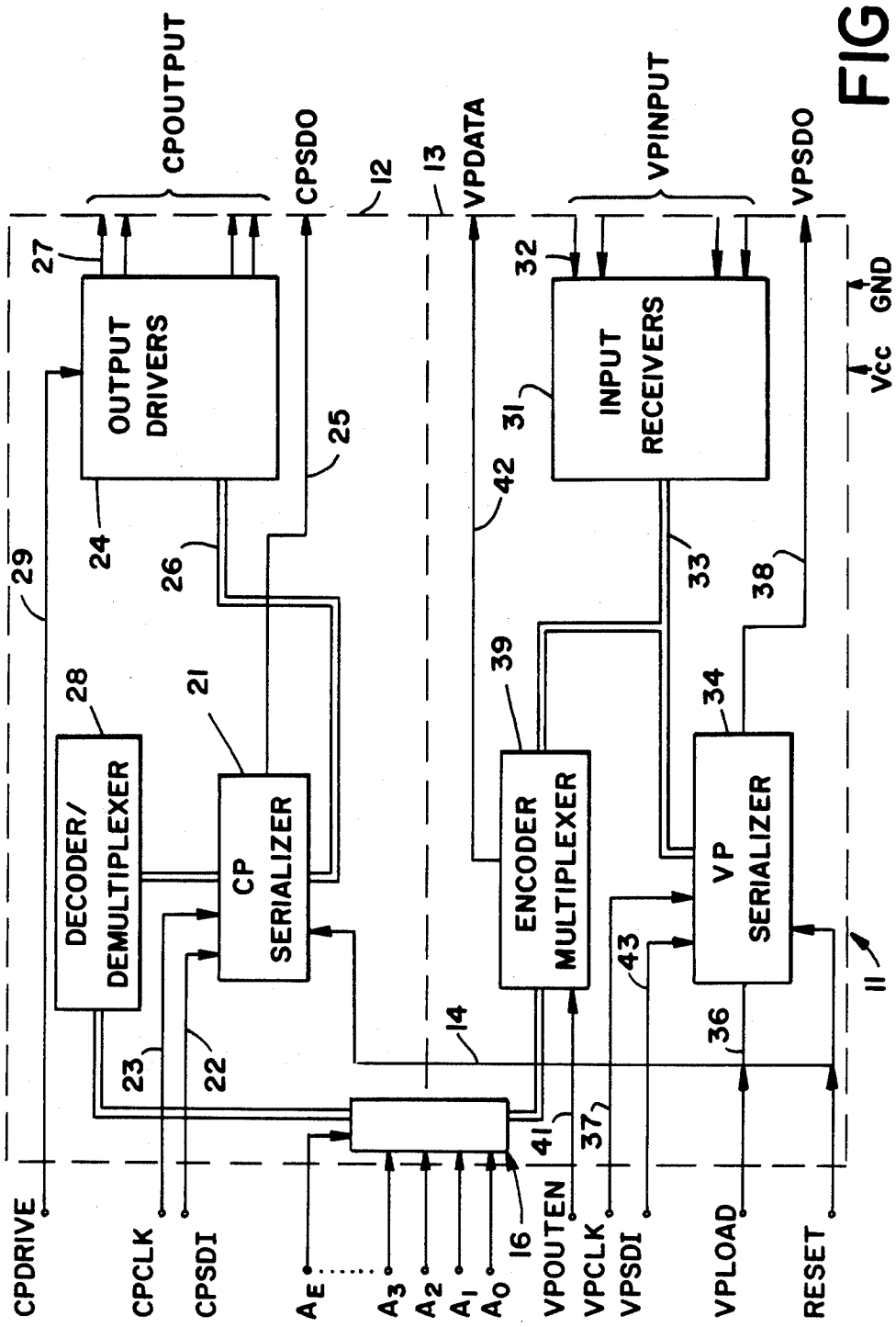
FIG. 1 is a block diagram of a testability system in accordance with the present invention.

The system of the present invention is illustrated in block form in FIG. 1 and referring thereto it is noted that the system 11 may be formed of a first or control point section 12 and a second or visibility point section 13. A master reset 14 will be seen to be common to both sections and a test point address unit 16 is also common to both sections. It is, however, noted that separate reset and test point address lines may be employed if desired. It is also noted that the control point section 12 and visibility point section 13 may be operated in conjunction with each other or separately.

Considering first the control point section 12 of the system it is noted that there is provided a CP serializer 21 connected to receiver serial data input from control point CPSDI line 22 and a control point clock signal, CPCLK, on line 23. The CP serializer 21 may also be termed a control register, wherein data is loaded, as from line 22, and data is shifted in and out in response to the clock signal on line 23. The serializer 21 also receives a reset signal via reset line 14 for initializing operation. Serial input loaded into the serializer 21 is transferred therefrom to output drivers 24 via lines 26. These output drivers 24 are connected through individual lines 27 to functional circuit nodes of a circuit to be tested.

This sytem of the present invention is also adapted to receive parallel data and apply same to functional circuit nodes of the circuit to be tested. In order to load parallel data the correct address is applied to test point inputs 16 having input lines identified as $A_0$, $A_1$, $A_2$, $A_3$. A further test address input identified as $A_E$ may be provided for expanding possible addresses beyond those capable from $A_0$ through $A_3$. Control point addresses are applied through a decoder/demultiplexer 28 to the CP serializer 21 to force a logic "1" or a logic "0" to the serializer location corresponding to the address for subsequent application through the output drivers 24 to the functional circuitry to be tested.

It will be seen from the foregoing that the control point section of the present invention is capable of receiving either serial input data or parallel data. There is also provided a CP driver input line, CPDRIVE, 29 connected to the output drivers 24 for actuating same to force parallel data to all control points of the functional circuitry.

It is also noted that CP serializer 21 is provided with a CPSDO line 25 for outputting serial data from the serializer 21. This serial data output may be employed for control point expansion and also provided for internal verification of that data in the control point section of the present system.

The visibility point section of the present system is provided for examining data from visibility points such as circuit element outputs of a functional circuit to be tested by application of data to the control thereof. In this section there are provided unit load input receivers 31 having input lines 32 connected to so called visibility points in a functional circuit under test. This visibility data is applied through lines 33 to VP serializer 34 and loaded therein, in response to signal on VPLOAD line 36. The states or data captured by the serializer 34 may be shifted out under control of clock signals provided on VPCLK line 37 and outputted on a VPSDO line 38. Such data or state might then be externally compared to predetermined correct data or states correspondingly to control point data employed for the test.

Data from input receivers 31 is also applied through lines 33 to an encoder multiplexer 39 for observing real time states of the visibility points. This may accomplished by selection of the proper address at the test point address unit 16 and application of a control signal to VP enable line, VPOUTEN, 41 for enabling the encoder/multiplexer output to apply the selected data to VPDATA line 42. There is also provided a VPSDI line 43, connected to VP serializer 34 for applying serial data input visibility point expansion and for internal verification of data or state, stored in the VP serializer 34 via the VPSDO line 38.

The testibility system of the present invention as illustrated in FIG. 1 and described above may be readily implemented by conventional electronics that may, for example, incorporate printed circuit bords or the like. Reference in this respect is made to FIGS. 2 and 3 of the drawings wherein there is illustrated elements and connections of the control point section 12 and the visibility point section 13, respectively. The same terminology and number has been employed in these figures as in FIG. 1 and for convenience only one-half of a sixteen point system is illustrated in detail. Thus, in FIG. 2, for example, there is shown circuitry and gates for eight control points identified by the numeral 12 with a duplicate thereof indicated with 12' only generally being indicated to complete a sixteen control point system. Input $A_0$ through $A_E$ are considered in this instance to comprise control input lines and it will be seen that a decoder/demultiplexer 28 for a sixteen point system may be implemented by appropriate connections of 30 gates with the CP serializer 21 comprising 128 gates provided by conventional semiconductor units, 51 and the output driver 24 comprising 16 gates 52, with three possible states for each. It is again noted that the outputs 27 identified as CP1, CP2, etc. are adapted to be connected to the selected control points of circuitry to be tested. Serial data may be applied to the control points by inserting such data as terminal or line 22, also identified as CPSDI in FIG. 2. Parallel data is supplied at $A_0$ through $A_3$ and parallel data from the system is applied to control points in response to command at CPDRIVE 29 for operating the output drivers 24. Serial data may also be outputted for shelf testing or expanding the system at line 25 identified as CPSDO.

The present invention may be readily comprised as integrated circuits and a control point section 12 having sixteen control point outputs may be packaged in a 28 pin package while a 32 control point section may be packaged in a 48 pin package and the like.

One manner of implementing the visibility point section 13 of the present invention is illustrated in FIG. 3 and referring thereto it will be seen that the VP input at VP1, VP2 etc. is applied both to the serializer 34 and the encoder/multiplexer 39. Coincidence circuits of the serializer 34 also receive VPLOAD signals at 36 and VPDSI signals at 43 with visibility point signals in serial form appearing at VPDSO 38 in clocked sequence as established by VPCLK at 37 and operation being initialized by reset 14. VPSDO is externally compared to the proper and desired visibility point signals resulting from the control point signals or data originally employed through the present invention to initiate particular transformation of state or the like in circuitry being tested. Parallel visibility point data is provided from the encoder/multiplex 39 at the VPDATA terminal 42 in accordance with VP address data applied at $A_0$ through $A_3$ upon command of a VP out enable signal at 41.

In the illustration of FIG. 3 there are shown only eight visibility point inputs with a duplication of the illustrated circuitry being at 13' to obtain a sixteen point system as described above. Such a sixteen point system may be implemented as illustrate by incorporating 154 gates in the serializer and 34 gates in the encoder/multiplexer for a total of 188 gates, and this may be packaged in 28 pin package.

It will be seen from the foregoing that the present invention provides a system for testing of functional electronic circuitry with both serial and parallel control point input data capability for applying predetermined data to input nodes of circuit elements of functional circuitry under test and observing resultant logic states at output nodes of the functional circuitry being tested. The present invention may be provided as a separate entity or alternatively may be incorporated within functional circuitry for testing of the same. Furthermore, the present invention is not limited to any particular test pattern or the like but instead may employ any externally initiated control point data or any desired internally established control point data as in some predetermined test mode. Furthermore, the present invention is not limited to any particular functional circuit for testing of same inasmuch as the control points may be chosen for any circuit with the visibility points being then associated with each control point to identify logic states at the output nodes of functional circuitry in response to the application of control point or other input signals.

It is further noted that the present invention provides for serial or parallel testing so that commercially available equipment of either type may be employed by the present invention. Thus, for example, serial data based test equipment may be employed to evaluate parallel logic states within functional circuitry. Additionally the present invention provides for the use of parallel data base test equipment and techniques either in place of or in conjunction with serial data input/output techniques so as to materially expand the testability of functional circuits.

Although the present invention has been described above in connection with a particular preferred embodiment thereof it will be apparent to those skilled in the art that modifications and variations are possible within the scope of the present invention and thus it is not intended to limit the invention to the precise terms of description or details of illustration.

What is claimed is:

1. A testability system for functional circuits comprising
    a control point section having a decoder/demultiplexer with means for receiving as inputs parallel control point input data and a serializer connected to receive serial input data means for electrically connecting the output of said decoder/demultiplexer to control points of a circuit under test, and
    a visibility point section having input means adapted for connection to visibility point output nodes of said circuit under test and including a serializer for producing visibility point data in serial form and an encoder/multiplexer for producing visibility point data in parallel form all in response to said control point or other data for testing circuit operation.

2. The system of claim 1 further defined by said control point section having a plurality of output drivers switchable into one of three discrete logic states, and drive terminal for receiving switching signals for actuating said output drivers to apply parallel control point data to a circuit being tested.

3. The system of claim 1 further defined by means clocking the output of said control point serializer and the output of said visibility point serializer.

4. The system of claim 1 further having at least one address unit for receiving addresses and applying said addresses to said control point decoder/demultiplexer and to said visibility point encoder/multiplexer for parallel data handling.

5. A system for applying test signals to a circuit to be tested comprising
    an address unit for receiving addresses,
    a decoder/demultiplexer connected to said address unit,
    a serializer connected to receive serial input data and to receive the output of said decoder/demultiplexer to generate therefrom serial control point signals, and
    output drivers connected to said serializer and having control means connected to a parallel driver terminal for applying control point signals in serial or parallel form to control points of a circuit to be tested to alter states at output nodes thereof.

6. A system for identifying logic states at output nodes of logic circuitry during circuit testing comprising input receivers connected to visibility points at output nodes of logic circuitry,
    a serializer connected to said input receivers for generating from the output data at said visibility points output data in serial form upon command, and
    an encoder/multiplexer connected to said visibility point receivers for producing parallel visibility point data related to addresses applied to said encoder/multiplexer upon receipt of an enabling signal.

* * * * *